No. 745,097. Patented November 24, 1903.

UNITED STATES PATENT OFFICE.

OTTO EBERHARD, OF LUDWIGSLUST, GERMANY.

PROCESS OF PREPARING FAT-FREE CASEIN.

SPECIFICATION forming part of Letters Patent No. 745,097, dated November 24, 1903.

Application filed December 3, 1901. Renewed September 16, 1903. Serial No. 173,478. (No specimens.)

*To all whom it may concern:*

Be it known that I, OTTO EBERHARD, a subject of the Emperor of Germany, residing at Ludwigslust, Mecklenburg, Germany, have invented a certain new and useful Process of Preparing Fat-Free Casein, of which the following is a specification.

The usual way of separating milk by centrifugal power leaves on an average from two to three per cent. of fat in the same. If such skimmed milk as will leave two per cent. of fat be used for the preparation of casein, the precipitated casein will contain about six to eight per cent. of fat. In order to make fat-free casein thereof, it is necessary to resort to the process of removing the fat from the casein by means of fat-extracting matters.

The present invention is a simplified and improved process for producing fat-free casein.

I have found that it is possible to remove the fat from skimmed milk almost entirely by means of centrifugal power by adding about two to four per cent. of hydrate of soda, the alkalized milk being slightly heated before submitting it to the centrifugal action. This will result in the removal of the fat, except to about four one-thousandths per cent. From the milk thus freed from fat it is possible to obtain directly technically fat-free casein. Hydrate of potash may also be employed instead of hydrate of soda. These alkalies may also be replaced more or less by alkaline salts or other soluble alkalies.

The process for the preparation of casein—that is, as much as possible fat-free—by a direct precipitation of the skimmed milk—that is, as much as possible perfectly fat-freed—is consequently, as explained as an example, the following one: One thousand liters of skimmed milk obtained in the usual way by means of centrifuging rich milk are mixed with from two to four kilos of hydrate of soda dissolved in water. The skimmed milk may also be slightly heated. The skimmed milk thus strongly alkalized and perhaps also heated is again to be centrifuged until there is an end of the precipitation of fat. Thereupon by an adequate admixture in the usual way of diluted sulfuric acid or some other acids which may be suitable for the precipitation of casein the casein is separated and afterward collected, washed, pressed, and, if so required, also dried. It is also feasible to add the alkalies at once to the rich milk and centrifuge, and then obtain the casein from fat-freed milk in the same way. If required, this casein, which is, technically speaking, to be styled "fat-freed," may afterward be treated with fat-extracting matters. However, the casein obtained by way of precipitation will answer the requirements as to absence of fat in all cases of really practical importance.

Having thus fully described my invention, what I claim as new, and desire to secure by Letters Patent of the United States, is—

The herein-described process for obtaining technically fat-free casein, which consists in adding alkali to milk, removing the fat centrifugally, and precipitating the liquid by acids, substantially as described.

In witness whereof I have hereunto set my hand in presence of two witnesses.

OTTO EBERHARD.

Witnesses:
 E. H. L. MUMMENHOFF,
 OTTO W. HELLMRICH.